(No Model.)
H. YOUNG.
TRANSMITTING POWER TO CRANES AND OTHER HOISTING APPARATUS.
No. 314,906. Patented Mar. 31, 1885.
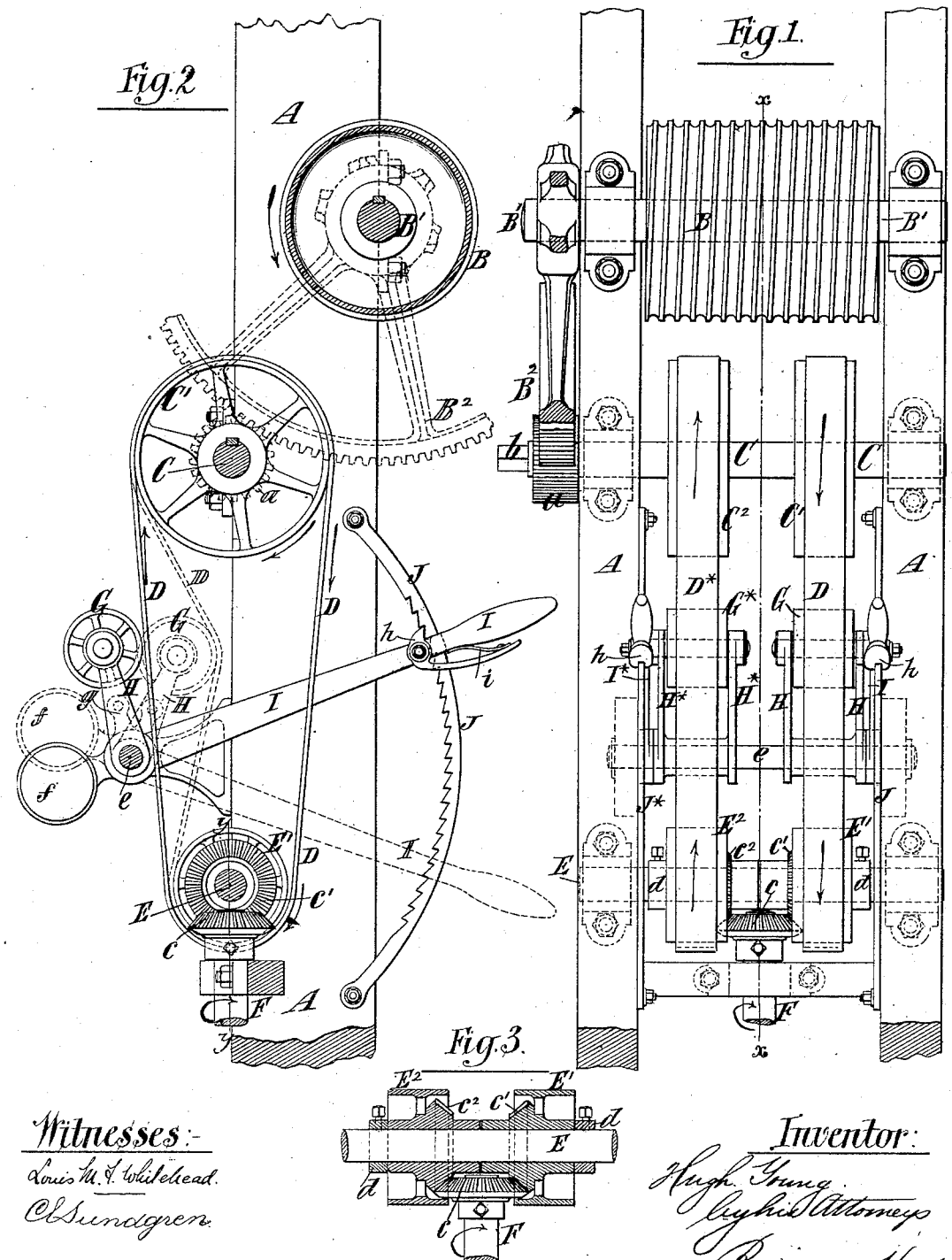
Witnesses:—
Louis M. S. Whitehead.
C. Sundgren.
Inventor:
Hugh Young.
by his Attorneys
Brown & Hall

UNITED STATES PATENT OFFICE.

HUGH YOUNG, OF NEW YORK, N. Y.

TRANSMITTING POWER TO CRANES AND OTHER HOISTING APPARATUS.

SPECIFICATION forming part of Letters Patent No. 314,906, dated March 31, 1885.

Application filed September 1, 1884. (No model.)

*To all whom it may concern:*

Be it known that I, HUGH YOUNG, of the city and county of New York, in the State of New York, have invented a new and useful Improvement in Means for Transmitting Power to Cranes and other Hoisting Apparatus, of which the following is a specification.

My invention relates to means for transmitting power to cranes and overhead travelers; and the invention consists, essentially, in an improved means for enabling the operator to transmit the power from a shaft moving rapidly and with uniform speed, so that the parts receiving the power may be started very gently, and gradually increased in speed to a rapidity of action that would be injurious to tackle and machinery but for the graduation of the speed in starting.

In the accompanying drawings, Figure 1 is a front elevation of a portion of a crane embodying my invention. Fig. 2 is a vertical section on the plane of the dotted line $x\,x$, Fig. 1; and Fig. 3 is a detail sectional view on the dotted line $y\,y$, Fig. 2.

Similar letters of reference designate corresponding parts in all the figures.

C designates the power-receiving shaft, which is mounted in suitable bearings on the frame A, and which is geared at one or both ends with the shaft B' of the hoisting-drum B by means of a pinion, $a$, and spur-wheel $B^2$. The ends of the power-receiving shaft C may be squared, as shown at $b$, to enable a crank to be applied for turning the shaft by hand when necessary.

Upon the shaft C are securely fixed two pulleys, C' $C^2$; and D D* designate two slack belts which hang from these pulleys downward to two pulleys, E' $E^2$. The pulleys E' $E^2$ are the power-giving pulleys, and are arranged to run continuously in opposite directions at a speed which will impart the highest speed required to the belts.

In the drawings I have illustrated a mode of driving said pulleys by making them fast to bevel or angle wheels $c'\,c^2$, which are loose on a fixed shaft, E, and they are driven by the bevel or angle wheel $c$ on the power-shaft F. The wheels $c'\,c^2$ are held in engagement with the intermediate driving wheel or pinion, $c$, by means of collars $d$ on the shaft E, and the rotation of the power-shaft F and wheel or pinion $c$ continuously in one direction will impart a continuous rotation to the wheels and pulleys $c'$ E' $c^2$ $E^2$ in reverse directions.

G G* designate two tightening-pulleys mounted in swinging frames H H*, which are fulcrumed upon a rod or shaft, $e$, fixed in the frame A; and I I* designate two levers which are counterbalanced by suitable weights, $f$, and are connected each with one of the frames H H* in any suitable manner. The levers I I* are loose on the rod or shaft $e$, and through their arms $g$ (shown dotted in Fig. 2) control the swinging pulley-frames H H*, to which they are securely bolted.

At the outer end of the levers I I* are catches $h$, which are actuated by springs $i$ to throw them into engagement with suitable notched quadrant-bars, J J*, whereby the levers may be held in any position to which they are adjusted. When the levers I I* are in their highest position, as shown in Fig. 1 and in full lines in Fig. 2, the tightening-pulleys G G* will be out of contact with the belts D D*, which will hang loose and clear of the pulleys E' $E^2$.

It is evident that when the belt D is tightened the receiving-shaft C will turn in one direction, and when the belt D* is tightened said shaft will turn in the other direction.

The desired graduation of the speed of the receiving-shaft C is obtained by graduating the tightening of the belt. If the belt is tightened sufficiently, the shaft C will receive its maximum speed, and may be driven at any less speed by reducing the tightness of the belt. The tightening of the belt being completely under control of the operator, he can regulate the motion of the shaft C so as to avoid all injurious shock or strain to machinery or tackle by sudden application of the power. I can therefore in some parts of the work run at speed inadmissible but for this graduation, yet in the beginning, ending, or any other part of the movement apply the power with any degree of gentleness, the change of speed at any and all times being subject wholly and directly to the will of the operator. When the shaft C is required to turn in one direction only, a single belt may be used—for example, the belt D. Only one set of belt-controlling mechanism G H I J would then be required, and the pulley E′ might be operated by the shaft F and wheels $c$ $c'$; or the latter might be dispensed with, and a simple pulley fast on a continuously-rotating shaft substituted for the pulley E′ and fixed shaft E.

What I claim as my invention, and desire to secure by Letters Patent, is—

1. The combination, with the drum-shaft B′, the power-receiving shaft C, and the wheel and pinion $B^2$ $a$, connecting said shafts and a pulley on the shaft C, of a continuously-rotating pulley below and in line with the pulley on said receiving-shaft, a slack belt for connecting said pulleys, a tightening-pulley and a lever, I, for applying the same, a notched bar, J, and a catch, $h$, upon the lever for engaging with said bar, substantially as and for the purpose herein described.

2. The combination, with the power-receiving shaft of a crane or hoisting apparatus and two pulleys thereon, of two pulleys arranged to rotate continuously in reverse directions below the pulleys on said power-receiving shaft, two slack belts for connecting said pulleys on the power-receiving shaft with said reversely-rotating pulleys, and tightening-pulleys movable toward and from said belts for tightening them separately, substantially as herein described.

3. The combination, with the power-receiving shaft C and its pulleys C′ $C^2$, of the lower shaft, E, loose pulleys and bevel-wheels E′ $c'$ $E^2$ $c^2$ on said shaft E, the shaft F and its wheel $c$, the belts D D*, and mechanism for separately controlling said belts, substantially as herein described.

HUGH YOUNG.

Witnesses:
H. GENGEMBRE HUBERT,
C. HALL.